W. C. GARDINER.
CONTROL DEVICE APPLICABLE TO AIRCRAFT, MARINE STEERING GEAR, AND OTHER APPARATUS.
APPLICATION FILED APR. 1, 1920.

1,389,347.

Patented Aug. 30, 1921.

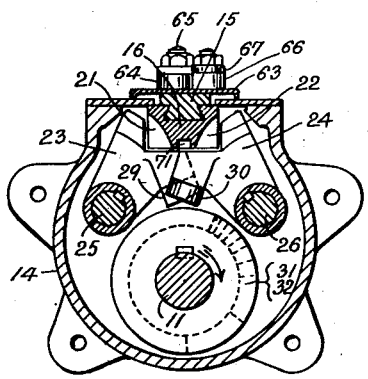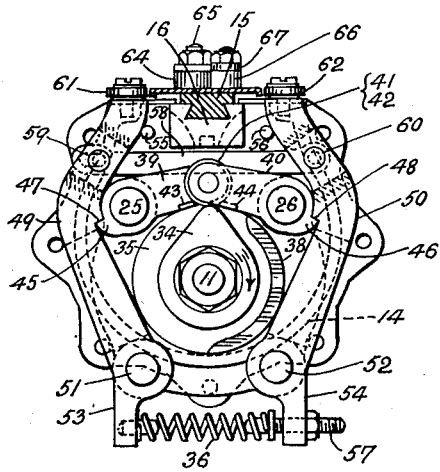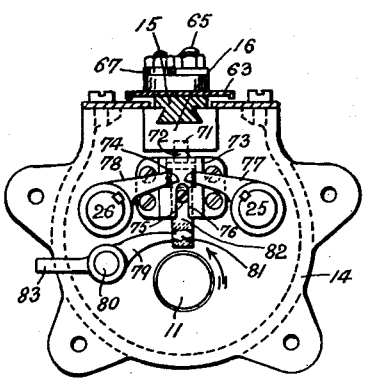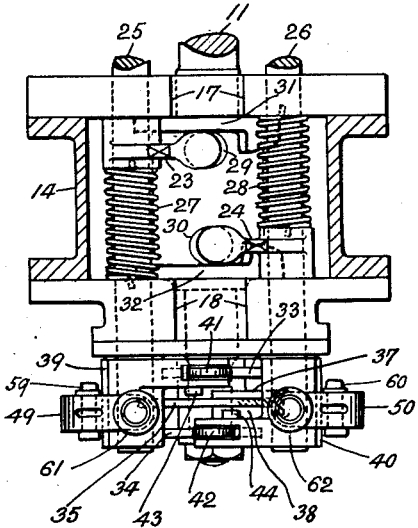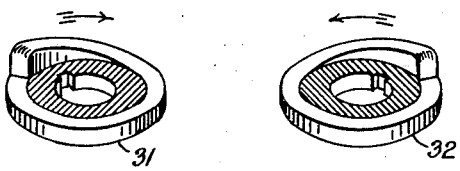

W. C. GARDINER.
CONTROL DEVICE APPLICABLE TO AIRCRAFT, MARINE STEERING GEAR, AND OTHER APPARATUS.
APPLICATION FILED APR. 1, 1920.
1,389,347.
Patented Aug. 30, 1921.
3 SHEETS—SHEET 3.
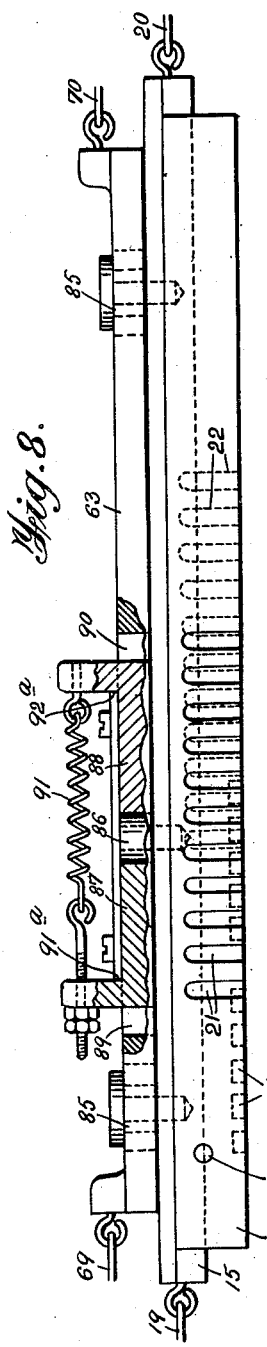
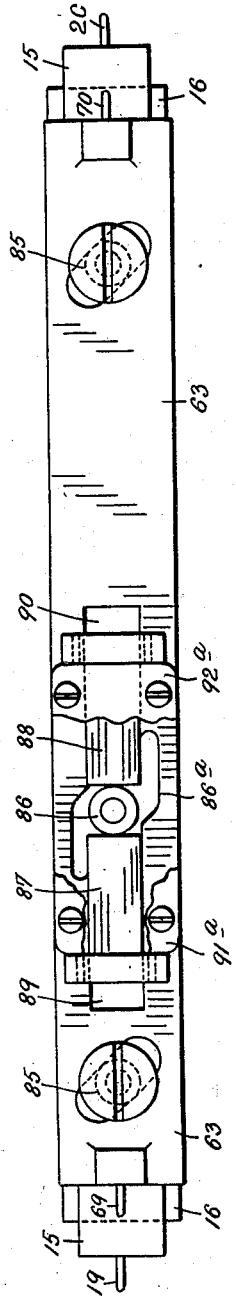
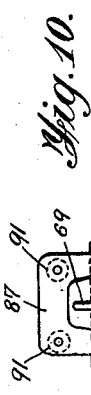

UNITED STATES PATENT OFFICE.

WILLIAM CHARLES GARDINER, OF BARNSTAPLE, ENGLAND.

CONTROL DEVICE APPLICABLE TO AIRCRAFT, MARINE STEERING-GEAR, AND OTHER APPARATUS.

1,389,347.  Specification of Letters Patent.  Patented Aug. 30, 1921.

Application filed April 1, 1920. Serial No. 370,440.

*To all whom it may concern:*

Be it known that I, WILLIAM CHARLES GARDINER, of Gloucester Villa, Barnstaple, in the county of Devon, England, a subject of the King of Great Britain, have invented certain new and useful Improvements in Control Devices Applicable to Aircraft, Marine Steering-Gear, and other Apparatus, of which the following is a specification.

This invention relates to apparatus for transmitting motion in either of two directions alternatively at will, and has for its object to provide what may be termed a combined automatic power-relay and hunting-gear whereby to enable a load to be moved, on the one hand by manual effort alone, and on the other hand by mechanical power either alone or conjointly with the exertion of the manual effort itself, in such manner that, when the resistance due to the load exceeds a predetermined value, the mechanical power will be brought into operation automatically but will remain subject to manual control exercised through the same means as that through which the unaided manual effort was transmitted.

The invention is especially adapted to provide means for relieving an aircraft pilot, marine steersman, or other similar operator, of excessive strain due to the actuation of aircraft controls, marine steering-gear, or the like, without interruption to the normal movements performed by any usual manually-operable means provided for effecting such actuation; the apparatus of the invention, while serving to bring the mechanical power into operation only when the manual effort, to be effective, would require to exceed a predetermined value, nevertheless leaving the mechanical power subject to continuous control exercised through the medium of manual movements exactly similar to those which would be required if the unaided manual effort were sufficient to move the load.

The apparatus of the present invention comprises a motion-transmitting element movable to and fro and so coupled to the load to be moved as to be capable of transmitting motion thereto in a corresponding direction; a prime mover and a connection therefrom to said element whereby to permit of the latter receiving motion from the prime mover in either direction alternatively; a manually-operable controlling-member movable at will in either of two directions alternatively; a second motion-transmitting element movable in a general direction corresponding to that of the first member and so coupled to the controlling-member as to move to and fro as one with the latter; a yielding connection between the two motion-transmitting elements such that motion will be transmitted from the second to the first element without lost motion between them so long only as the resistance due to the load does not exceed a predetermined value; and means whereby, when such resistance exceeds the predetermined value and said connection consequently yields under the manual effort transmitted through it, the resulting displacement of the second element relatively to the first due to lost motion between them is caused to bring the prime mover into operation to move the first element in a direction and to an extent corresponding to the direction and extent of the motion manually imparted to the controlling member.

The first motion-transmitting element may be movable in a predetermined path and the second motion-transmitting element may be mounted in proximity to the first element and be so connected thereto as, on the one hand, to be movable as one therewith when such motion is transmitted from the prime mover through the first element to the second, and, on the other hand, to be bodily displaceable relatively to the first element, in opposition to spring action, laterally of its general direction of motion toward one side or the other in accordance with the direction of motion when the motion is imparted to the second element from the controlling member and the elastic connection between the two elements yields under the force transmitted.

The first element may be constituted by a slide fitted to move in rectilinear guides, and the second element may be constituted by a bar which extends lengthwise of said slide and is so mounted thereon as to be bodily movable, parallel to itself, obliquely with reference to the path of the slide.

Thus for example, the bar constituting the second element may be supported toward each of its ends by one arm of each of a pair of bell-crank levers fulcrumed on the slide constituting the first element, said bar being subject to spring action tending to retain it in normal position transversely of the slide, while the other arms of the bell-crank levers are coupled together by a link which is connected by its respective ends to the controlling member, from opposite directions. Or the bar constituting the second element may be connected toward each of its ends with the slide constituting the first element by a pin-and-slot device, the slots of the respective pin-and-slot devices extending parallel to one another and obliquely with reference to the path of the slide, while the bar, which is connected by its respective ends to the controlling member, from opposite directions, is subject to spring action tending to retain it in normal position transversely of the slide.

The bar constituting the second element, when displaced in the one or the other direction laterally of the slide constituting the first element, may bring the prime mover into operation, to move the slide in the direction of the longitudinal component of such lateral displacement of the bar, by exerting pressure against the corresponding one of a pair of laterally-movable members which are subject to spring-action tending to retain them in contact with the respective sides of the bar.

The prime mover may be kept constantly running, and be brought into driving connection with the first motion-transmitting element as a result only of displacement of the second motion-transmitting element relatively to the first.

The prime mover may actuate the first motion-transmitting element positively, by imparting to it motion step-by-step, repetition of a step being dependent upon maintenance of the manual pressure, exerted through the medium of the second motion-transmitting element, whereby the prime mover was brought into operation to produce the previous step.

The invention will be described as applied to apparatus for controlling a flight-governing element (such as e. g. a pair of ailerons, or an elevator) of an aircraft, as set forth in the specification of a pending application for Letters Patent No. 292,642, said apparatus consisting in the combination, with a pair of control-cables or equivalent elements for actuating such flight-governing element in opposite directions respectively, of a slide coupled to said cables or equivalent elements and movable to-and-fro so as to be adapted to impart motion to said flight-governing element in the one or the other direction alternatively, manually-controlled mechanically-operated and automatically-acting cam-mechanism of the kind described in the specification of Letters Patent No. 1,277,130 adapted to actuate said slide step-by-step in either direction alternatively at will, and means for automatically locking the slide against displacement in either direction after the completion of each step of its movement and for automatically unlocking the slide immediately before a fresh step.

In the accompanying drawings:—

Fig. 3 is an end elevation, viewed from the right-hand side of Fig. 1;

Fig. 4 is an end elevation, viewed from the left-hand side of Fig. 1;

Fig. 5 is a plan view with the slides and cover removed;

Fig. 6 is a cross-section on line 6—6 of Fig. 1; and

Figure 7:
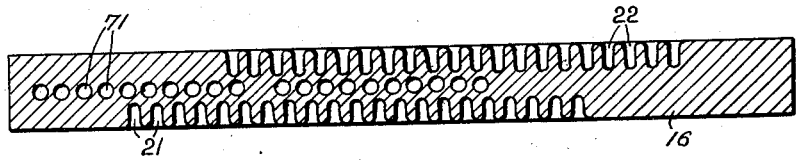
Fig. 7 is an inverted plan view of the main slide.

Figs. 7$^a$, and 7$^b$, are perspective views of the respective "main" cams, shown separately.

Figs. 8, 9 and 10 show, separately, a modification of the connection between the main slide and the laterally-displaceable bar carried thereby, Fig. 8 being a side elevation; partly in section; Fig. 9 a top plan view; and Fig. 10 an end elevation, partly in section, showing also a device for detachably locking together, under manual control, the two sections whereof the main slide is preferably composed.

A power-driven cam-shaft 11, which is continuously rotated in one direction (through suitable means, not shown) by the aircraft engine or by a servo-motor, extends horizontally through, and is journaled in ball thrust-bearings, 12, 13 at the respective ends of, a casing 14 which may be secured in any convenient position. The main slide, comprising upper and lower sections 15 and 16 which are slidable lengthwise of one another but are normally locked together, is fitted to move lengthwise to-and-fro in guides 17, 18 at the ends of the casing 14; this main slide occupying a position directly above the shaft 11 to which it is parallel. To the respective ends of the upper section 15 of the main slide are attached a pair of control-cables 19, 20 which are led in opposite directions and coupled by suitable means (not shown) to the flight-governing element to be controlled, so that according as the main slide 15, 16 is moved lengthwise in one direction or the other the cable 19 or 20 will be drawn upon and the cable 20 or 19 will be relaxed, with the result that the flight-governing element will be displaced in the one or the other direction.

The main slide 15, 16 has a series of equidistant notches 21 (twenty-one being shown in the example) cut along one of its lower edges, and an equal number of similar notches 22 cut at equal intervals apart along its other lower edge; any one of the notches 21, all of which are of equal width measured lengthwise of the slide, being adapted to be engaged by a pawl-lever 23 (in the form, substantially, of a bell-crank), while any one of the notches 22, which are all likewise of equal width, are adapted to be engaged by a similar pawl-lever 24. The pawl-levers 23 and 24 are respectively splined upon rocking-shafts 25 and 26 extending above and parallel with the cam-shaft 11, symmetrically at opposite sides of the interior of the casing 14, which is provided at its ends with bearings for the shafts.

The rocking-shafts 25, 26 with the pawl-levers 23, 24 which project inward therefrom respectively, constantly tend to move angularly so as to cause said levers to engage with the notches 21 or 22 at the corresponding side of the main slide; this tendency being due to the action of springs 27, 28 which are coiled under torsional stress about the respective rocking-shafts and are each anchored at one end to the casing 14 and at the opposite end to the hub of the corresponding pawl-lever. The springs 27, 28 also serve as thrust-springs acting, in opposite directions respectively, lengthwise of the rocking-shafts; for which purpose each spring is confined under compression between the casing and the corresponding pawl-lever so that the respective levers 23 and 24 tend to remain at opposite ends of the casing. Both shafts 25 and 26 are however normally locked, by means hereinafter described, in such angular position as to hold the levers 23 and 24 out of engagement with the main slide 15, 16.

The pawl-levers 23 and 24 carry antifriction rollers 29 and 30 adapted, when the respective rocking-shafts 25 and 26 are unlocked, to coöperate with "main" cams 31 and 32 which are fast on the cam-shaft 11 and adapted to displace, from normal position, the respective levers 23 and 24 lengthwise of their rocking-shafts 25 and 26 in opposition to the springs 27 and 28. Such displacement of either pawl-lever 23 or 24 is effected during an angular interval equal to rather less than one-half of a revolution of the cam-shaft 11; which angular interval will hereinafter be referred to as the operative portion of a revolution of the shaft 11 and main cams 31 and 32, while the complementary angular interval will be referred to as the idle portion of a revolution. It will thus be seen that the revolution of the cam shaft 11 has for effect to cause whichever of the pawl-levers (if either of them) happens to be in operative position, to move through a distance equal to the distance apart of two adjacent notches of the corresponding series on the main slide so that the main slide, being simultaneously engaged by the pawl-lever in question, is itself moved in the corresponding direction to the extent of one step. As soon as such movement is completed, that rocking-shaft 25 or 26 which was in use is automatically restored to its normal angular position, whereupon that pawl-lever 23 or 24 which was actuated is withdrawn from engagement with the main slide and also from the influence of the corresponding main cam 31 or 32 and is therefore freed to the action of the spring 27 or 28 whereby the pawl-lever is returned to normal position lengthwise of the shaft 25 or 26.

Only one of the rocking-shafts 25, 26 can be unlocked and displaced from normal angular position at one time, the other remaining locked; and the arrangement is such that, when either of the rocking shafts has been unlocked, the resulting step of movement imparted to the main slide 15, 16 must be carried to completion before a step in the opposite direction can be initiated. The means for effecting the necessary control of the rocking-shafts is as follows:—

The cam-shaft 11 is prolonged beyond the right-hand end of the casing 14 (Fig. 1) and has fast upon it, outside the casing, a pair of similar and similarly-placed edge-cams 33 and 34 hereinafter termed locking-cams, and a third cam placed between said locking-cams and consisting of a disk 35 from whose opposite faces project a pair of similar and similarly-placed ribs or flanges 37 and 38 which extend around rather less than half the circumference of the disk, and each of which corresponds in angular extent and position with the operative portion of the revolution of the shaft 11 and main cams 31, 32. These flanges 37, 38 constitute what are hereinafter termed timing-cams, so that the disk 35 with the flanges 37 and 38 may be regarded as forming a duplex timing-cam. The rocking-shafts 25 and 26 also project beyond the same end of the casing 14, and have fast upon them outside the casing, toward the opposite faces of the disk 35, levers 39 and 40 (hereinafter termed timing-levers) which carry antifriction rollers 41 and 42 respectively adapted to bear against the edges of the locking-cams 33 and 34; the function of the locking-cams being to restore the timing levers 39, 40, and therefore also the rocking-shafts 25, 26 and pawl-levers 23, 24 to normal angular position after a step of movement has been imparted to the main slide 15, 16.

The levers 39 and 40 are provided, on their mutually-adjacent faces, with projecting lugs 43 and 44 adapted to coact with the respective timing-cam flanges 37 and 38. The lugs 43, 44 remain outside the paths of the flanges 37, 38 so long as the timing-levers 39, 40 are so held that their rollers 41, 42 are clear of the locking-cams 33, 34; but, when either of the levers 39 or 40 is allowed to move so that its roller 41 or 42 bears against the locking-cam 33 or 34, the lug 43 or 44 comes into position to engage beneath the flange 37 or 38 and prevent the restoration of the lever 39 or 40 to normal position during that part of the revolution of the shaft 11 wherein the flange 37 or 38 overlies the lug 43 or 44. The angular interval during which the timing-cam flanges 37, 38 are passing the lugs 43, 44 coincides substantially with that operative portion of a revolution of the shaft 11 wherein alone the main cam 31 or 32 can shift the main slide in one direction or the other; and during such interval each of the lugs 43, 44 either on the one hand prevents its timing-lever 39 or 40 from moving so as to engage the corresponding locking-cam 33 or 34, or, on the other hand, prevents its timing-lever (if already in position to engage the corresponding locking-cam) from moving out of engagement therewith. It is to be understood, however, that the use of the disk 35 and timing-cam flanges 37, 38 is not essential, as these flanges do not force down, or normally hold down, the lugs 43, 44 and levers 39, 40 but merely provide a safeguard against the accidental displacement, from operative or inoperative position respectively, of whichever of said levers happens to be in or out of use, during that portion of a revolution of the shaft 11 which corresponds with the performance of a step of movement imparted to the main slide 15, 16. The stress of the springs 27, 28 is sufficient, under ordinary conditions, to retain the roller 41 or 42 in contact with the locking-cam 33 or 34 when so required.

The rocking-shafts 25, 26 are normally held in their inoperative angular position (which is that illustrated in the drawings), against the stress of the springs 27, 28, by the engagement, with nibs 45, 46 on the hubs of the timing-levers 39, 40, of detents 47, 48 on a pair of levers 49 and 50 (hereinafter termed locking-levers) which are fulcrumed at axes 51, 52 outside the adjacent end of the casing 14; these locking-levers being forced toward one another by a spring 36 interposed in compression between short arms 53, 54 which depend from the respective locking-levers beneath the axes 51, 52. The stress of the spring 36 is adjustable by means of an abutment-screw 57 carried by the arm 54, while movement of the locking-levers 49, 50 beyond their normal or operative positions, under the stress of the spring 36, is prevented by means of stops 55, 56. In order that, so long as either locking-lever 49 or 50 is displaced from normal position so as to unlock the corresponding timing-lever 39 or 40, the other locking-lever 50 or 49 shall be prevented from being likewise displaced, the levers 49, 50 are coupled together by means of a link 58 pivoted at 60 to the lever 50 and having at 59 a pin-and-slot connection with the lever 49 adapted to afford only the necessary freedom of movement of either locking-lever relatively to the other. The disengagement of either locking lever 49 or 50, alternatively, from the coacting timing-lever 39 or 40, and the consequent initiation of a step of movement of the main slide 15, 16 in the corresponding direction, is effected automatically as follows:

The locking-levers 49, 50 extend upward at opposite sides of the main slide 15, 16 and carry at their upper ends antifriction rollers 61, 62 which, when the locking-levers rest in normal position against their stops 55, 56, engage the opposite edges of a horizontal control-bar 63 extending above and parallel to the upper section 15 of the main slide; the control-bar 63 being so mounted upon the slide-section 15 as to be movable laterally thereof. For this purpose, in the example under consideration, the bar is connected with the slide-section 15 by means of the longitudinally-extending arms 64 of a pair of bell-crank levers which are fulcrumed to the slide-section 15 at 65 and whereof the transversely-extending arms 66 are coupled together by a horizontal link 67 which extends above and parallel to the control-bar 63, so that any longitudinal movement of the link 67 relatively to the main slide 15, 16 in either direction, will result in transverse movement of the control-bar 63 relatively to the main slide in a corresponding direction. To the ends of the link 67 are attached cables 69, 70 which extend respectively in opposite directions and are connected by any suitable means to opposite sides of the hand-control lever or equivalent element (not shown) whereby the flight-governing element to be controlled is usually actuated. Hence, when the hand-control lever is moved from normal position in one direction or the other, the one cable 69 or 70 is drawn upon and the other cable 70 or 69 is relaxed so that the link 67 is pulled longitudinally in the direction corresponding to that of the pull. The link 67 being connected with the main slide 15, 16 by the transverse arms 66 of the bell-crank levers 64, 66, the main slide will participate in the longitudinal movement of the link 67 so long as the resistance to such movement of the main slide does not exceed the effort transmitted in the corresponding direction through the link 67. But when (owing, say, to wind-pressure in flight against the flight-governing element to be controlled) the stress in the cable 20 or 19 exceeds that transmitted through the cable 69 or 70 to the link 67, the main slide 15, 16 will lag behind the link 67 or will even remain stationary, with the result that the longitudinal movement imparted to the link 67 will produce transverse movement of the control-bar 63 in a direction corresponding to the direction of the pull. Hence, the control-bar 63 will bear against the roller 61 or 62 so as to displace the locking-lever 49 or 50 from its normal position, and when the timing-lever 39 or 40 has in consequence become unlocked, a step of movement of the main slide 15, 16 will be performed during the next revolution of the cam-shaft 11; the relative arrangement of the various parts being such that this step of movement of the main slide is performed in the same direction as that of the pull manually transmitted through the link 67. The manual effort may be maintained until as many successive steps of movement have been continuously imparted to the main slide as are required for producing the desired change in the position of the flight-governing element which is the subject of control; otherwise, on the manual effort ceasing, the strain now existing in the cable 19 or 20 will tend to restore the main-slide 15, 16 and therefore also the link 67, longitudinally to normal position, while at the same time the control-bar 63 will be restored transversely to its normal mid position by means of the spring 36 acting through that locking-lever 49 or 50 which had been actuated, so that the locking-lever 49 or 50 which was released will reëngage the timing-lever 39 or 40 during the next revolution of the shaft 11 and locking-cams 33 and 34.

Figure 1:
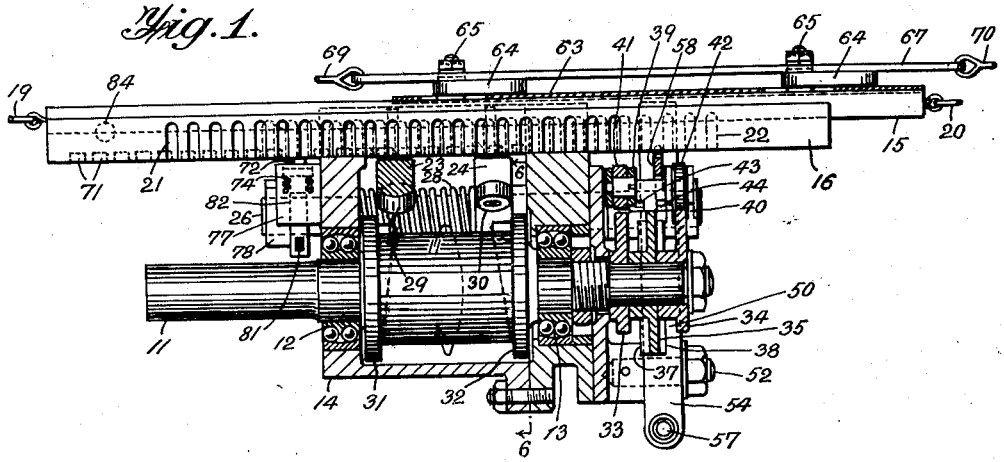
Figure 1 is a sectional side elevation of the apparatus.
Figure 2:
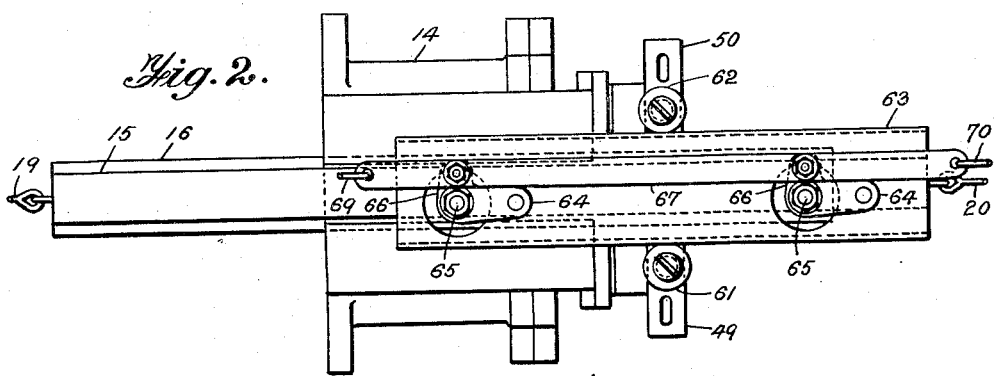
Fig. 2 is a top plan view.

In order to lock the main slide 15, 16 in any position to which it has been brought, and thus to prevent the flight-governing element under control from being returned, by the pressure of the air during flight, to the position from which it has just been moved, the lower section 16 of the main slide is provided on its underside with a longitudinal row of holes 71 corresponding in number and distance apart with the notches of both rows 21 and 22, and a vertically-movable locking-pin 72, adapted to engage in any hole of the row is slidably mounted in a bearing 73, beneath the main slide, upon the left-hand end of the casing (see Fig. 1). The locking-pin 72 constantly tends, under the pressure of a spring 74, to engage in whichever of the holes 71 is for the moment presented above it; such hole corresponding, as regards its position in the row, with the particular notch 21 or 22 with which the pawl-lever 23 or 24 is for the time being engaged. A stud 75, which projects from the locking-pin 72 through a slot 76 in the bearing 73, is adapted to be engaged and forced downward, so as to depress the pin 72 out of engagement with the holes 71, by either one of a pair of radial arms 77, 78 fast on the adjacent projecting end-portions of the rocking-shafts 25, 26, when the particular rocking-shaft which for the time being is in use is allowed to turn from its normal to its operative angular position.

Hence, on the one hand, just before the pawl-lever 23 or 24, under the action of the main cam 31 or 32, begins to move lengthwise of its rocking-shaft 25 or 26 and to communicate movement to the main slide 15, 16, the locking-pin 72 will, as the result of the depression of the arm 77 or 78, be withdrawn from the hole 71 with which it is engaged; whereas on the other hand, just before the pawl-lever 23 or 24, having shifted the main slide 15, 16 to the extent of one step of its movement, becomes completely disengaged from a notch 21 or 22 in the slide, the return angular movement of the rocking-shaft 25 or 26, due to the action of the locking cam 33 or 34, will, as a result of the raising of the arm 77 or 78, permit the locking-pin 72 to engage in the fresh hole 71 now presented above it, thus effectually locking the main slide against longitudinal displacement in either direction.

It will be observed, on reference to Fig. 7, that no hole of the series 71 is provided in the position corresponding to the center of length of the row, so that the main slide 15, 16, remains unlocked when occupying its mid position or is moved only slightly in either direction therefrom. The object of thus leaving the main slide free when in, or in the neighborhood of, its mid position is to then afford the aircraft pilot perfect freedom to manipulate his hand-control lever in either direction to the small extent required in practice for maintaining the equilibrium of the aircraft in normal steady flight; the manual movement necessary in such circumstances being very small in amount, and the accompanying effort being delicate as regards the force exerted.

For the purpose of enabling the locking-pin 72 to be withdrawn at will from engagement with any of the holes 71, a small lever 79, fulcrumed at 80 on the end of the casing 14, engages by one of its arms in a slot 81 in a downward prolongation 82 of the locking-pin; the lever 79 having another arm 83 whereby it may be actuated manually through any convenient connection (not shown). The arm 83 is, in practice, never used or required, except during primary adjustment of the apparatus when, for example, the cables 19, 20 are being coupled to the ailerons of aircraft.

84 represents the position of a transverse dowel-pin whereby the sections 15, 16 of the main slide are normally held locked together so as to move as one. Means would be provided whereby, in the event of its being found necessary to actuate the flight-governing element by direct manual effort independently of the power-operated control-apparatus described above, the dowel-pin 84 could be withdrawn by hand so as to permit of the upper section 15 of the main slide moving to-and-fro relatively to the lower section 16, which would remain locked by the pin 72. A convenient means for controlling the dowel-pin 84 will be described in connection with the modified form of control-bar illustrated in Figs. 8, 9 and 10.

In the modification just referred to, the control-bar 63 has the cables 69, 70 (which are coupled to the usual hand-lever or equivalent element) attached directly to its opposite ends, and is connected toward each of its ends with the upper member 15 of the main slide 15, 16 by a pin-and-slot device 85, the slots of the respective pin-and-slot devices extending parallel to one another and obliquely with reference to the path of the slide. The upper member 15 of the main slide carries an upright pin provided with an antifriction roller 86 which is accommodated in a slot 86$^a$ provided in the control-bar 63, and against this roller bear a pair of centering-dogs 87, 88 fitted to slide in guides 89, 90 lengthwise of the control-bar; the dogs 87, 88 being drawn toward one another by a spring or springs 91 so that the control-bar 63 constantly tends to remain in mid or normal position both lengthwise and also transversely of the main slide 15, 16 as a whole. The control-bar 63 works between, and may actuate, the locking-levers 49, 50 precisely as in the example previously described; the normal position of the controlling-bar being determined, independently of the stops 55, 56, by the resting-position of the dogs 87, 88 whose mutual approach is limited by a plate serving as guide for the dogs and presenting stops 91$^a$, 92$^a$, the interval between which corresponds to the diameter of the roller 86.

As shown in Fig. 10, the dowel-pin 84, which normally serves to lock together the upper and lower members 15 and 16 of the main slide and which extends transversely so as to engage recesses in both, is fitted to slide in a guide-socket 92 attached to the lower member 16 and is normally held in engagement with both members by a spring 93; the dowel-pin 84 being attached to a "Bowden wire" 94 or equivalent device whereby it may be withdrawn at will, in opposition to the spring 93, from both members of the main slide.

What I claim and desire to secure by Letters Patent is:—

1. In apparatus for transmitting motion in either direction alternatively at will, a combined automatic power-relay and hunting-gear comprising a motion-transmitting element movable to and fro and so coupled to the load to be moved as to be capable of transmitting motion thereto in a corresponding direction; a prime mover and a connection therefrom to said element whereby to permit of the latter receiving motion from the prime mover in either direction alternatively; a manually-operable controlling-member movable at will in either of two directions alternatively; a second motion-transmitting element movable in a general direction corresponding to that of the first member and so coupled to the controlling-member as to move to and fro as one with the latter; a yielding connection between the two motion-transmitting elements such that motion will be transmitted from the second to the first element without lost motion between them so long only as the resistance due to the load does not exceed a predetermined value; and means whereby, when such resistance exceeds the predetermined value and said connection consequently yields under the manual effort transmitted through it, the resulting displacement of the second element relatively to the first due to lost motion between them is caused to bring the prime mover into operation to move the first element in a direction and to an extent corresponding to the direction and extent of the motion manually imparted to the controlling-member.

2. Apparatus as claimed in claim 1, wherein the first motion-transmitting element is movable in a predetermined path and the second motion-transmitting element is mounted in proximity to the first and is so connected thereto as, on the one hand, to be movable as one therewith when such motion is transmitted from the prime mover through the first element to the second, and, on the other hand, to be displaceable relatively to the first element, in opposition to spring action, laterally of its general direction of motion, toward one side or the other in accordance with the direction of motion when the motion is imparted to the second element from the controlling member and the elastic connection between the two elements yields under the force transmitted.

3. Apparatus as claimed in claim 2, wherein the first motion-transmitting element is constituted by a slide fitted to move in rectilinear guides, and the second motion-transmitting element is constituted by a bar which extends lengthwise of said slide and is so mounted thereon as to be bodily movable, parallel to itself, obliquely with reference to the slide.

4. Apparatus as claimed in claim 3, wherein the bar constituting the second motion-transmitting element is supported toward each of its ends by one arm of each of a pair of bell-crank levers fulcrumed on the slide constituting the first motion-transmitting element, said bar being subject to spring action tending to retain it in normal position transversely of the slide, while the other arms of the bell-crank levers are coupled together by a link which is connected by its respective ends to the controlling member, from opposite directions.

5. Apparatus as claimed in claim 3, wherein the bar constituting the second motion-transmitting element is connected toward each of its ends with the slide constituting the first motion-transmitting element by a pin-and-slot device, the slots of the respective pin-and-slot devices extending parallel to one another and obliquely with reference to the path of the slide, while the bar, which is connected by its respective ends to the controlling member, from opposite directions, is subject to spring-action tending to retain it in normal position transversely of the slide.

6. Apparatus as claimed in claim 3, wherein the bar constituting the second motion-transmitting element brings the prime mover into operation by exerting pressure against the corresponding one of a pair of laterally-movable members which are subject to spring action tending to retain them in contact with the respective sides of the bar.

7. Apparatus as claimed in claim 3, wherein the slide constituting the first motion-transmitting element comprises two sections which are slidable lengthwise of one another and whereof the one section is coupled to the load and has the second motion-transmitting element displaceably connected with it while the other section is adapted to receive motion from the prime mover, means being provided for normally locking said sections together and for enabling them to be released from one another at will, substantially as and for the purpose set forth.

WILLIAM CHARLES GARDINER.